Figure 2:
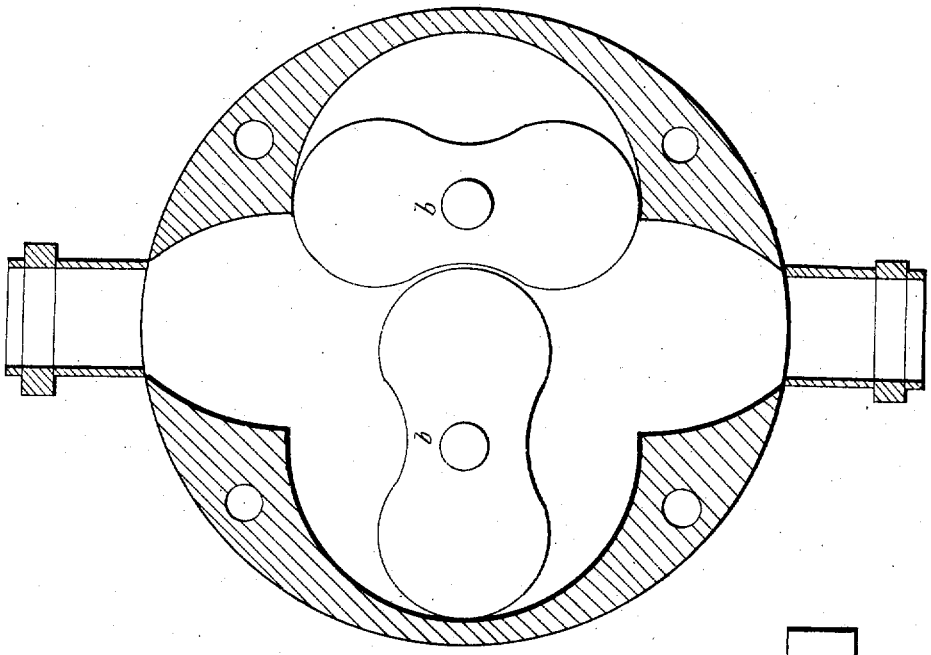
Figure 1:
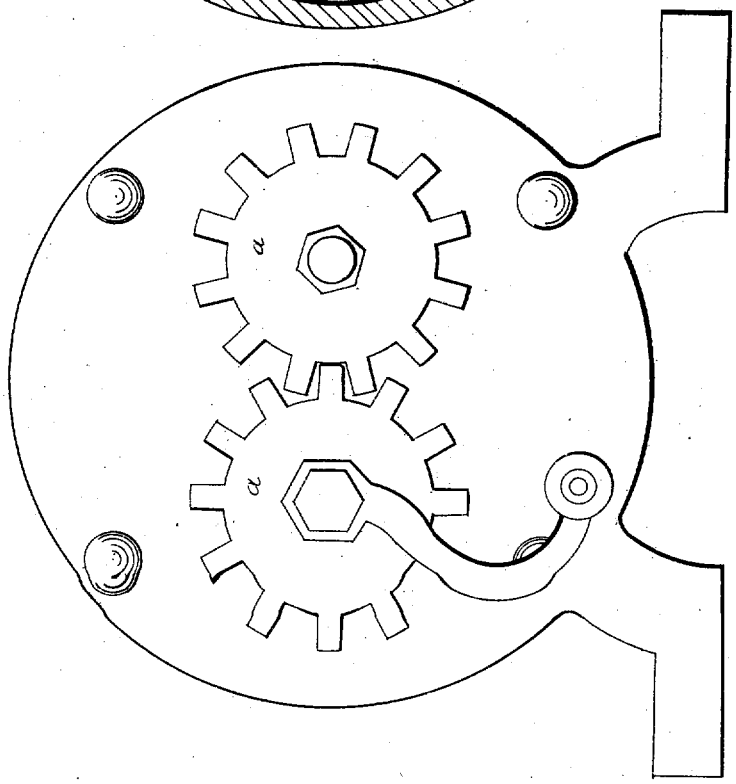

9005X

D. M. Walker,

Rotary Pump.

Patented Aug. 15, 1835.

N. PETERS, PHOTO-LITHOGRAPHER, WASHINGTON, D. C.

Aug 13, 1835 Aug. 15, 1835 9005X 409

David M. Walker, of Cavendish, State of Vermont

Letters Patent

The schedule referred to in these Letters Patent and making part of the same containing a description in the words of the said David M. Walker, himself of his improvement In the Rotary Hydraulic Pump, To all to whom these presents shall come.

Be it known that I David M. Walker of Cavendish in the County of Windsor, and State of Vermont, have invented a new and useful improvement in the Rotary Hydraulic Pump, and the following is a full and exact description of the construction and operation of the said machine as improved by me, it being an improvement on "Hubbards rotary Pump" of which the following is a correct description to wit. Hubbards pump consists of a cast iron shell, perfectly circular with flat sides or ends. Within the shell are two cylinders each containing eight curved floats, which mash together during the revolutions of the cylinders. or during the operation of the pump, which revolutions of the cylinders, or operation of the pumps is effected by means of a crank attached to the end of the arbor of one of the cylinders which in revolving comes in contact with the other cylinder and propels it. The revolutions of the cylinders produce a vacuum which is immediately filled with water through the orifice in the bottom, which water is thrown out at the top by the continued revolutions of the cylinders with their floats. The external appearance of mine is similar to Hubbards, with the exception of two small cog wheels fitted to the end of the arbor of each cylinder. Its internal parts consist of two cylinders, each of which has two wings or circular floats only, fitted to an exact circle on the inside of the shell, and also to mash one into the other in the operation of the pump, The small cog wheels on the outside of the pump are so arranged that by means of them and a crank the said cylinders are propelled and the collision or friction of the cylinders is obviated, Another advantage which this possesses is, the cylinders work closer and exclude more of the atmosphere air from the tube below, and consequently will produce a vacuum with ease, It is also simple in its construction internally and not

[illegible] made from

9005X ot liable to get out of order, and will discharge a third more water in a given
time. What I claim as my own invention and not previously known in the
bove described machine, is the internal construction of the cylinders, they being
onstructed with only two wings or circular solid floats, fitted to an exact cir-
le on the inside of the shell, and meshing one into the other in the opera
tion of the pump. And also I claim as my own invention and not
reviously known in the above described machine, the two small cog wheels
ttached to the arbors of the cylinders on the outside, by means of which small
wheels the cylinders are prevented from coming in collision, or from im-
inging each other; and thus all wear of them is avoided In testimony that the above is a true specification of my said
improvement as above described, I have hereunto set my hand this sixth day
f July A.D. 1835, Witnesses Reuben Washburn
Horace Fletcher D. M. Walker 602 [illegible]

W.

(Drawing)